G. GARDNER.

CHAIR-SEAT.

No. 7,202.

Reissued July 4, 1876.

WITNESSES

L. Van Riswick.

D. G. Stuart

INVENTOR

George Gardner per R. Hamway atty.

UNITED STATES PATENT OFFICE.

GEORGE GARDNER, OF BROOKLYN, NEW YORK, ASSIGNOR, BY MESNE ASSIGNMENTS, TO HIMSELF, WILLIAM GARDNER, AND JANE E. GARDNER.

IMPROVEMENT IN CHAIR-SEATS.

Specification forming part of Letters Patent No. 127,044, dated May 21, 1872; reissue No. 7,202, dated July 4, 1876; application filed April 8, 1876.

*To all whom it may concern:*

Be it known that I, GEORGE GARDNER, of the city of Brooklyn, county of Kings, and State of New York, have invented an Improved Bottom for Seats, &c., of which the following is a specification:

This invention relates to improved bottoms for seats, &c.; and it consists of layers of veneering, each alternate one of which has its grain running in an opposite direction to that of the intermediate one, in combination with one or more layers of textile or fibrous material, substantially as hereinafter more fully set forth and claimed.

Figure 1:
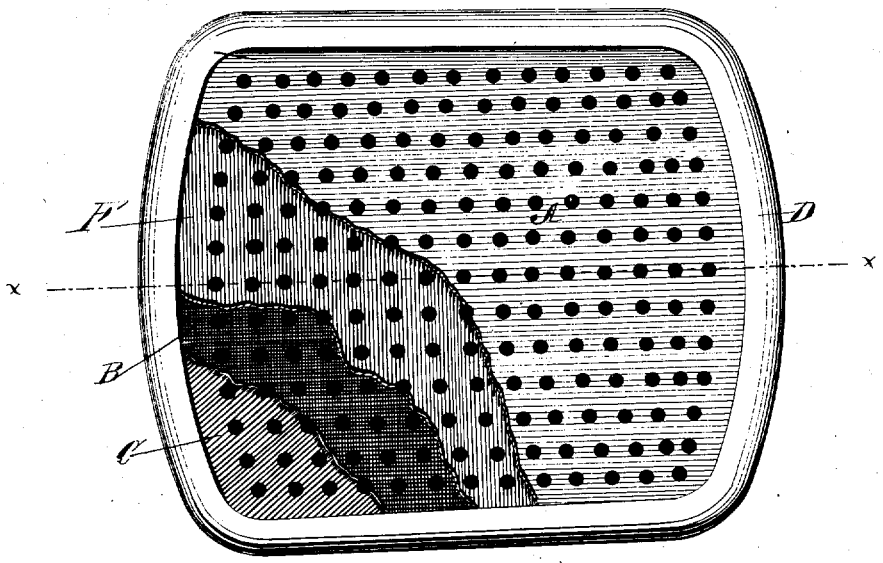
Figure 2:
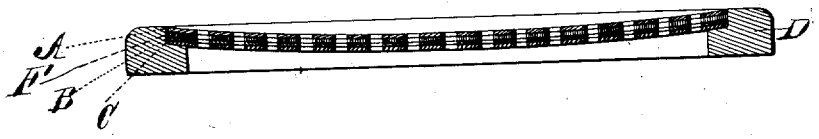

Figure 1 in the annexed drawing illustrates a plan view of the bottom of a seat having my improvement applied thereto, with a part of the upper or top layer of veneering broken away, exhibiting a layer of canvas or other textile or fibrous material, and a portion of said canvas or other textile or fibrous material removed, showing a second layer of veneering, with its grain running in a contrary direction to that of the said top layer; and Fig. 2 represents a longitudinal vertical section of the same.

Like parts in the two figures are designated by similar letters.

To enable others to make and use my invention, I will proceed to describe it.

In the accompanying drawing I show three layers of veneering, A F C, and a single layer of canvas, or other textile or fibrous material, B, which are glued together and secured within the frame D.

In practice, the layers of veneering and canvas, or other textile or fibrous material, may be increased in number, if desired. Any textile or fibrous material may be made to serve the purpose of the canvas; but I prefer the canvas, as it is cheap, strong, and durable.

Although I have described my improvement as applied to seats for chairs, still I do not confine myself to its use in any particular article of furniture.

The bottom of the seat thus made may or may not be provided with perforations, for the purpose of ventilation or ornamentation; but I prefer to make it so, and I also prefer to make it curved or concave on its upper side, as it materially adds to the comfort of those using it.

Having thus described my invention, what I claim, and desire to secure by Letters Patent, is—

1. An improved bottom for a seat, consisting of two or more layers of veneers of wood, with their grains crossing each other or diversified, in combination with one or more layers of textile or fibrous material, secured together by an adhesive material, substantially as described.

2. An improved bottom for a seat, consisting of two or more layers of veneers of wood, with the grains crossing each other or diversified, in combination with one or more layers of textile or fibrous material, secured together by an adhesive substance, and having perforations formed therein, for the purpose of ventilation or ornamentation, substantially as described.

3. The combination of a seat-bottom, constructed of two or more veneers or thin layers of wood, having the grain of each layer laid crosswise of the other, and one or more layers of canvas or other textile or fibrous material interposed between any two or more of the adjoining veneers, and the whole secured together by an adhesive substance in the manner described, with the frame of a seat, substantially as set forth.

4. The combination of a seat-bottom, constructed of two or more veneers or thin layers of wood having the grain of each layer laid crosswise of the other, and one or more layers of canvas or other textile or fibrous material interposed between any two or more of the adjoining veneers, and the whole secured together by an adhesive material, and provided with perforations, with the frame of a seat, in the manner substantially as and for the purposes set forth.

5. As a new article of manufacture, a bottom for a seat, consisting of two or more layers of wood, with one or more layers of canvas or other textile or fibrous material interposed between any two or more of said veneers, and the whole secured together by an adhesive material, and provided with perforations, and with a curved or concave upper surface, in the manner and for the purposes set forth.

In testimony whereof I have hereunto signed my name this 6th day of March, 1876, in the presence of two subscribing witnesses.

GEO. GARDNER.

Witnesses:

CHARLES G. COE,
LOUIS W. FROST.